United States Patent [19]

Hüttner

[11] Patent Number: 4,767,312
[45] Date of Patent: Aug. 30, 1988

[54] ARRANGEMENT FOR PRODUCING SYNTHETIC PLASTIC MOLDED PARTS

[75] Inventor: Manfred Hüttner, Notzingen, Fed. Rep. of Germany

[73] Assignee: Pebra GmbH Paul Braun, Esslingen, Fed. Rep. of Germany

[21] Appl. No.: 34,545

[22] Filed: Apr. 6, 1987

[30] Foreign Application Priority Data

Apr. 4, 1986 [DE] Fed. Rep. of Germany ....... 3611249
Mar. 9, 1987 [EP] European Pat. Off. ......... 87103333.8

[51] Int. Cl.⁴ ............................................ B29C 45/38
[52] U.S. Cl. .................................. 425/543; 249/142;
249/176; 264/328.6; 264/328.9; 264/328.12;
425/556; 425/562; 425/571; 425/577;
425/DIG. 51
[58] Field of Search .................... 264/328.9, DIG. 83,
264/328.6, 328.12; 425/543, 554, 555, 556, 561,
562, 563, 571, 577, DIG. 51; 249/142, 176

[56] References Cited

U.S. PATENT DOCUMENTS

2,913,767 11/1959 Simon ................................. 425/555
4,342,717 8/1982 Gardner ............................. 425/555
4,372,741 2/1983 Cane et al. ....................... 264/328.9
4,404,160 9/1983 Bonissone et al. ............... 264/328.9

Primary Examiner—Jay H. Woo
Assistant Examiner—C. Scott Bushey
Attorney, Agent, or Firm—Erwin S. Teltscher

[57] ABSTRACT

In production of synthetic plastic molded parts, a sprue part is separated from the molded part by one displacing slider which cooperates with one limiting surface and displaces a sprue film from a sprue gap between a sprue passage and a mold nest, while an overflow part is separated from the molded part by another displacing slider which cooperates with another limiting member and displaces an overflow film from an overflow gap between the mold nest and an overflow passage.

17 Claims, 8 Drawing Sheets

ARRANGEMENT FOR PRODUCING SYNTHETIC PLASTIC MOLDED PARTS

BACKGROUND OF THE INVENTION

The present invention deals with a method and an arrangement for producing synthetic plastic molded parts. In a so-called reaction-injection molding of synthetic plastic molded parts, two initially liquid reaction components, such as polyetherpolyol and polyisocyanate, are supplied by a dosing pump to a mixing head and united to form a reaction mixture. The reaction mixture flows from the mixing head via a sprue passage into a molding tool and reacts there to form a solid material, for example polyurethane. For providing swirling-free supply of the mixture, the flow from the cylindrical outlet passage of the mixing head is converted into a gap flow by a distributing device which includes a limiting member or beam. A film sprue is formed in the region of the sprue gap. The film sprue must have a certain width in correspondence with the respective molded part. In the event of a material with a filler, for example with a glass fiber filler, a certain gap thickness must be maintained, for ensuring optimal flow conditions for the mixture introduction. In the event of an asymetrical geometry of molded parts and the use of filled materials, it can be necessary to provide a material overflow on the side opposite to the sprue, for avoiding air inclusions. The overflow takes place also through a narrow gap similar to the sprue gap.

The sprue part which is formed on the hardened molded part must be removed from the molded part after opening of the mold outside of the molding tool, by means of special tools or manually by cutters or cutting templates. This separation must be performed accurately, since the contour of the cut simultaneously forms the outer contour of the molded part. Moreover, in this case the outer skin of the molded part is destroyed, which in the event of foam material parts with cellular structure results in the cells no longer being closed by the outer skin.

The German document DE-A-No. 1 924 022 proposes a solution of this problem, in accordance with which a blocking device is provided between the sprue passage and the mold nest. The blocking device includes a blocking piston which moves in an opening of the upper part of the molding tool and in the closed position abuts with its end surface against a lower part arranged on the separating wall. In the open position of the blocking piston, the sprue passage is connected with the mold nest via a released opening space. The reaction mixture follows this path from the mixing aggregate to the mold nest. After the end of the filling process, the blocking piston closes the mold nest, so that the sprue part located in the sprue passage is separated from the molded part, and after opening of the molding tools can be removed independently from the mold part. The blocking piston which is guided in the cylindrical opening extends at both sides over the sharp-edged separating wall. Thereby in the opening position a slot is formed, which is limited by the opening edge and located between the piston and the separating wall. The reaction mixture enclosed in this slot is sharply deflected, which leads to a swirling and to pressure differences responsible for material non-uniformity in the molded part because of the formation of air inclusions and pores in the molded part. Furthermore, the swirling causes a flow reorientation and even a reverse in the material stream. In the synthetic plastic materials with fillers, such as glass fibers, this leads to nonhomogeneity in the orientation of the fillers. Similar difficulties occur at the other end of the molding tool opposite to the sprue point or also inside the mold nest, when for example it is necessary to produce large-surface parts provided with hollows and made of filled materials.

SUMMARY OF THE INVENTION

Accordingly, it is an object of the present invention to provide a method and an arrangement for producing synthetic plastic molded parts, which avoid the disadvantages of the prior art.

More particularly, it is an object of the present invention to provide a method and an arrangement for producing synthetic plastic molded parts, in accordance with which a separation of a sprue and an eventual overflow as well as the provision of hollows in the mold part can be performed in one working step during the production process, and in accordance with which a high degree of homogeneity of the material over the whole molded part can be obtained in large-surface molded parts with synthetic fillers.

In keeping with these objects and with others which will become apparent hereinafter, one feature of the present invention resides, briefly stated, in a method of producing synthetic plastic molded parts, comprising the steps of mixing at least two reaction components in a liquid state to form a reaction mixture, injecting the reaction mixture into a mold nest of a molding tool via a sprue passage and then a sprue gap which connects the sprue passage with the mold nest and ensures a laminar flow, in a flow direction and within a predetermined time of shot, bringing the reaction mixture in the mold nest to reaction so that it hardens and/or foams in the mold nest and forms a molded part, displacing a sprue film which is formed in the sprue gap, before elapse of a starting time from a timing point of mixing the reaction components to a timing point of starting the reaction, and displacing a further material of the reaction mixture downstream of the sprue gap as considered in the flow direction, after elapse of the shooting time, but before elapse of the starting time.

The displacing of the further material can be performed a short time after displacing the sprue film, or simultaneously with displacing the sprue film from the sprue gap.

The reaction mixture flows into an overflow gap in the flow direction at a side opposite to the sprue passage and the further material is located in the latter as an overflow film. The displacing of the further material can be thus performed by displacing the overflow film from the overflow gap to separate the overflow film from the molded part. The displacing of the further material can be performed inside the mold nest so as to form a hollow in the molded part.

The sprue film or the further material can be displaced respectively in a predetermined displacement time, and the displacement chamber can be formed or opened in the predetermined displacement time.

When the method is performed in accordance with the present invention, the sprue gap which is open during the injection is closed immediately after the end of the time of shot, when the reaction mixture is still liquid, and the material is displaced from the gap region. Thereby the material located in the mold nest is separated from the sprue, and the subsequent cutting of the molded part after opening of the mold is no longer necessary. The overflow gap which is open during the injection, can be closed with displacement of the material located in it, in some cases with a short delay. Thereby the overflow is separated from the molded part before hardening. Finally, throughflow gaps can be provided inside the mold nest. During the injection the throughflow gaps are open and do not distort the material flow. However, after the end of shot, sometimes with a short delay, the throughflow passages are closed with displacement of the material located in them, so that differently designed hollows are formed in the molded part in correspondence with the contour of the displacement region. In all these cases, the undisturbed material flow leads to a homogeneous material distribution, which is maintained during subsequent displacement step.

In accordance with the present invention an arrangement is proposed, which comprises a sprue passage through which a reaction mixture, formed by mixing of two reaction components, passes in liquid state, and in which a sprue part is formed, a molding tool having an upper part and a lower part and a mold nest which communicates with the sprue passage so that the reaction mixture is injected via the sprue passage into the mold nest in a flow direction, so as to harden and/or foam in the mold nest and to form a molded part, one limiting member being located in the region between the sprue passage and the mold nest so as to limit one side of a sprue gap formed between the sprue passage and the mold nest and having a predetermined width and length, another limiting member being located downstream of the one limiting member as considered in the flow direction so as to limit one side of a throughflow gap for a further material of the reaction mixture, means for separating the sprue part from the molded part and including one blocking member which is located in the region between the sprue passage and the mold nest and formed as a one displacing slider, the one disaplacing slider having an end surface which limits another side of the sprue gap and has a width and length corresponding to the width and length of the one limiting member, the one displacing member being movable relative to the one limiting member so as to close the sprue gap and displace a sprue film formed in the sprue gap; and means for separating the further material and including at least one other blocking member located downstream of the one blocking member as considered in the flow direction, the other blocking member being formed as another displacing slider which is movable relative to the other limiting member transversely to the throughflow gap so as to close the throughflow gap and to displace the further material from the throughflow gap.

The one limiting member can be a part of a separating wall provided between the sprue passage and the mold nest. Means for hydraulically controlling the movement of the other displacing slider synchronously with or without a short delay relative to the movement of the one displacing slider can also be provided.

In accordance with an advantageous feature of the invention, the throughflow gap can be an overflow gap formed at a side of the molding tool, which is opposite to the sprue passage, and the other displacing slider can be movable transversely to the overflow gap so as to displace the further material from the overflow gap. An overflow chamber can be formed so that the overflow gap opens into the overflow chamber.

The throughflow gap formed in the mold nest can be closeable by the other displacing slider with formation of a material hollow in the molded part, the other displacing slider having a cross-section corresponding to a contour of the material hollow and an end surface with a shape corresponding to the other limiting member.

A displacement chamber can be provided in the region of at least one of the sprue gap and the throughflow gap for receiving the sprue film or the further material displaced by a respective one of the displacing sliders. This is especially advantageous in the event of a small flow shot space when there is insufficient space for receiving the material in the mold nest and in the overflow chamber.

The displacement chamber can open into a respective one of the gaps and have a piston which is actuated in synchronism with a respective one of the displacing sliders so as to change a receiving volume in the displacement chamber.

The sprue passage and the one limiting member can be located below the separating plane of the mold nest, while the sprue gap can extend in a plane corresponding to the separating plane.

In accordance with a further advantageous feature of the present invention, the other limiting member can be arranged on the mold opening member connected with the upper part of the molding tool, or formed as the mold opening member.

The method and arrangement in accordance with the present invention have the advantage in that an additional working step for separating the sprue film and the overflow film is dispensed with or can be replaced by a simple and inexpensive working step, such as grinding. Significant investments for special tools and cutting templates are no longer needed. Waste resulting from false or erroneous cutting in the sprue and overflow regions no longer occur. Moreover, the outer skin of the molded part is not damaged, which is especially important for molded parts with open-cell structure of the material. In the event of formation of hollows, the invention ensures that no junction seams are formed on the outflow side of the hollow, no air inclusions and pores are formed along the contour of a hollow because of swirling and pressure differences, and no reorientation of fillers and thereby a distortion or warping in the region of the hollow can occur.

The novel features of the present invention are set forth in particular in the appended claims. The invention itself, however, both as to its construction and its method of operation, will be best understood from the following description of preferred embodiments which is accompanied by the following drawings.

DESCRIPTION OF PREFERRED EMBODIMENTS

Figure 1:
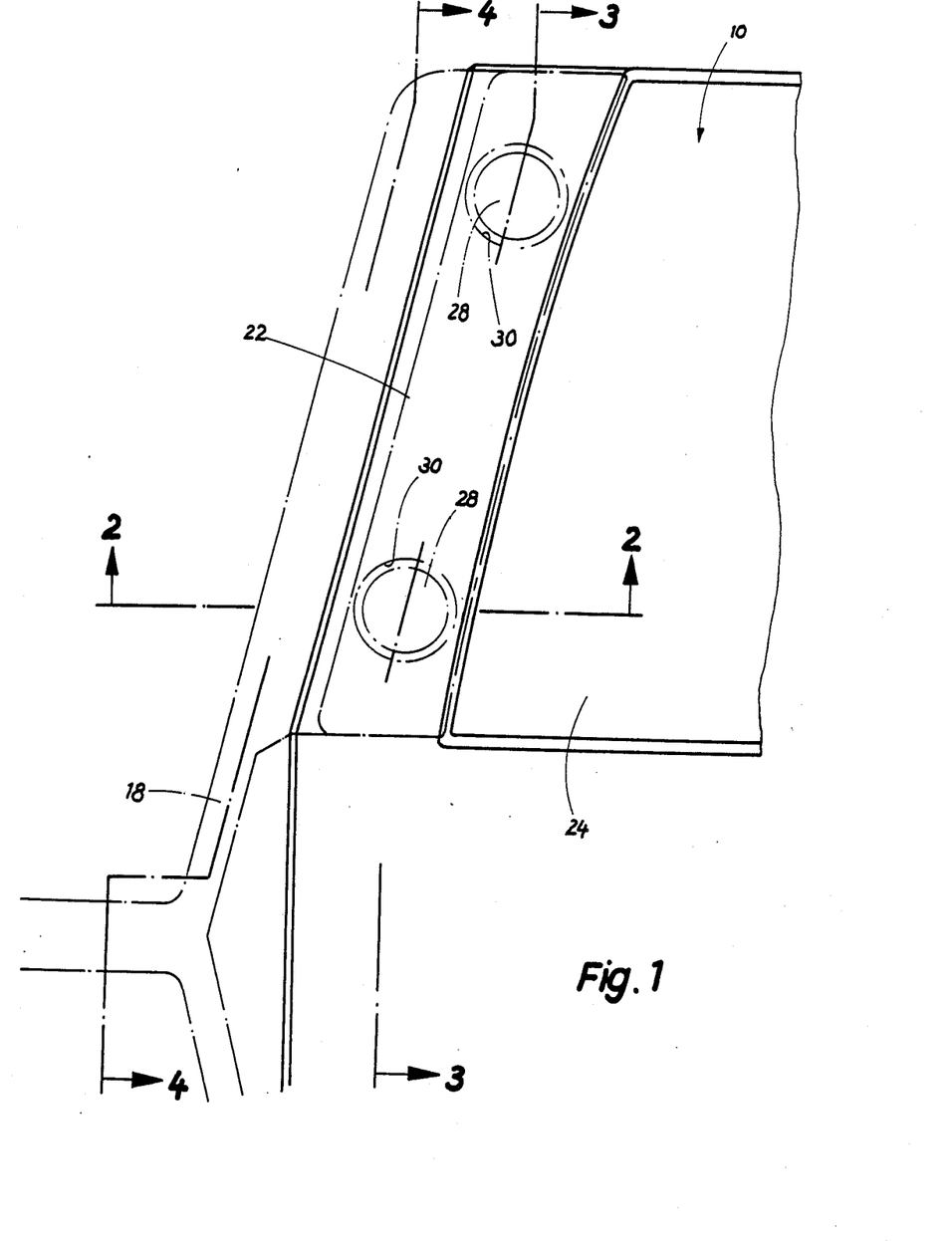
FIG. 1 is a plan view of an arrangement for producing synthetic plastic molded parts, in accordance with the present invention, and in particular in a sprue region associated with a molding tool.

An arrangement for producing synthetic plastic parts in accordance with the present invention includes a molding tool which is shown schematically and identified with reference numeral 10. The molding tool is composed substantially from two mutually displaceable and/or pivotable parts including an upper part 12 and a lower part 14. In the position when the upper and lower parts are closed, the molding tool 10 is supplied with a reaction mixture in liquid state from a not shown mixing head through a sprue passage 18 and a sprue gap 20. The reaction mixture is composed of two reaction components, such as polyetherpolyol and polyisocyanate. The reaction mixture is supplied through the sprue passage 20 into a mold nest 24 and expands there during a relatively short shooting time to an overflow gap 42 and then to an overflow chamber 44.

The sprue gap 20 is limited on its one side by a wider or broader surface of a limiting member or beam 22 which is formed in the lower part. The sprue gap is limited on the other side by an end surface of a displacing slider 26. The displacing slider 26 extends over the whole width of the sprue gap 20 and is arranged with a plunger 28 in a respective guide 30 displaceable transversely to the sprue gap 20.

A further displacing slider 48 is located at the overflow side of the molding tool and is slidably arranged in the upper part 12. The end surface of the displacing slider 48 limits from above an overflow gap 42 and extends over the whole width of this gap. In the embodiment shown in FIG.5, an undercut 40 is provided in the rear part of the mold nest 24. An additional slider 52 forms a mold opening member and abuts via a sliding jaw 54 against a neighboring side surface of the displacing slider 48. The broader surface of the overflow gap 42, which is opposite to the displacing slider 48, is arranged on a mold opening flap 46 which is articulately connected with the upper part 12.

The mold nest 24 forms a narrow reaction chamber for producing a thin-walled box-shaped molded part 25. The displacing slider 26 at the sprue side is provided on its side facing the mold nest with a contour which corresponds to the neighboring edge of the limiting member 22 and insignificantly extends with its end surface beyond the edge of the limiting member, substantially by a value which corresponds to the wall thickness of the molded part. The same is true with respect to the displacing slider 48 at the overflow side, which at its side facing toward the mold nest extends in the region of the edge of the molded part 25. With these features, a clean delineation and separation of the thin-walled molded part 25 from the sprue part and the overflow part are ensured.

Figure 2A:
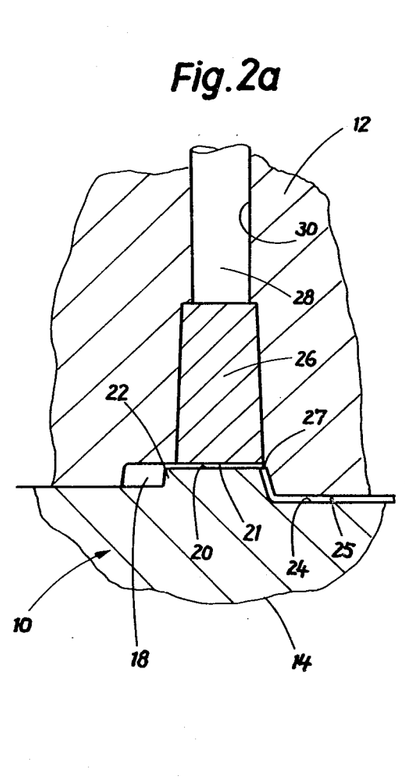
FIGS. 2a–2c are views showing a vertical section taken along the line 2—2 in FIG. 1 and illustrating three different positions of a displacing slider.
Figure 2B:
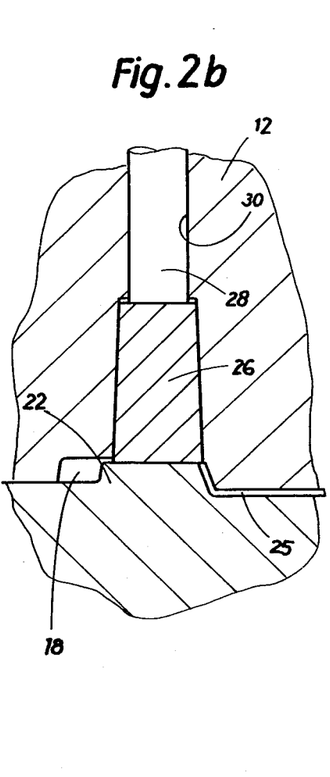
Figure 5:
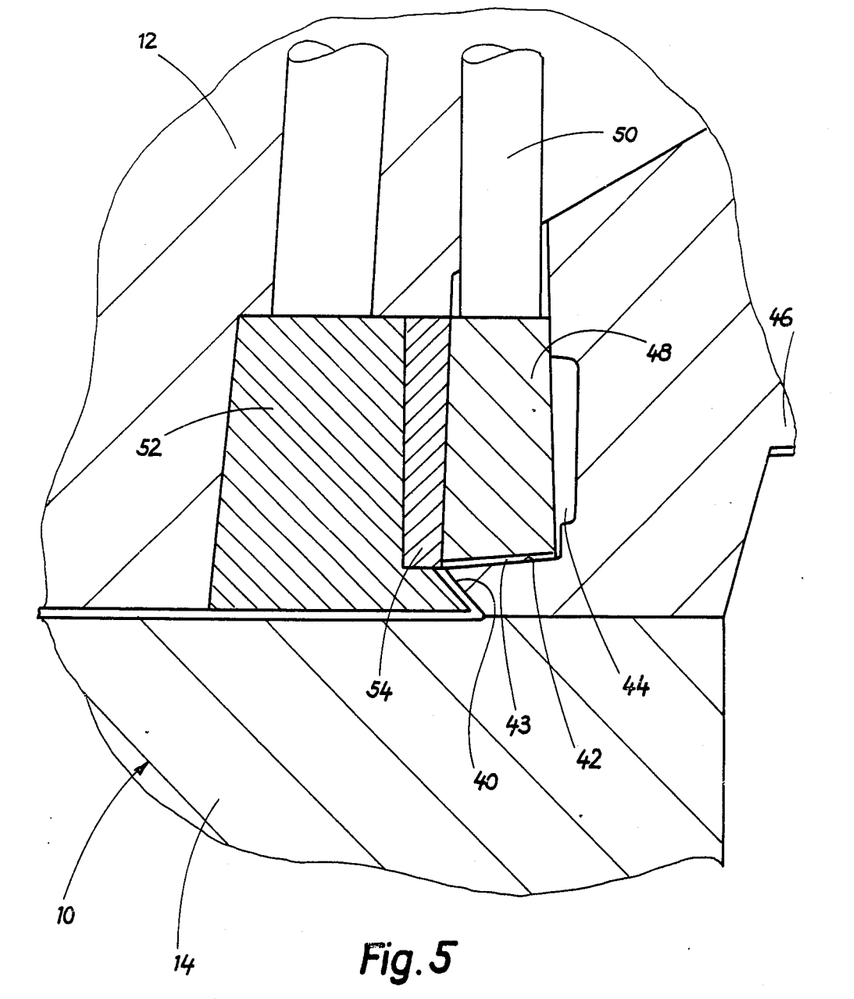
FIG. 5 is a view showing a vertical section taken in an overflow region associated with the molding tool.

During the injection step, the displacing sliders 26 and 48 are located so that they release the sprue gap 20 and the overflow gap 42 in the position in which the displacing sliders are withdrawn into the upper part 12, as shown in FIGS. 2a and 5. The reaction mixture is supplied through the sprue gap 20 into the mold nest 24 and expands there, until it exits through the overflow gap 42 into the overflow chamber 44. Immediately after the injection step at the end of the time of shot, the displacing slider 26 is displaced to the position shown in FIG. 2b. In this position its end surface is pressed against the wider surface of the limiting member 22. The material which is located in the sprue gap and forms a sprue film 21 is displaced in liquid state into the mold nest 24. Since a separation plane 27 of the mold nest 24 coincides with the plane of the gap, the sprue film 21 is cleanly separated from the molded part 25.

In a short time after the displacement process in the sprue region, the displacing slider 48 in the overflow region is displaced against the opposite wider surface of the overflow gap 42. An overflow film 43 which is located in the overflow gap 42 is displaced into the mold nest 24 and/or the overflow chamber 44. Thereby the overflow film 43 is cleanly separated from the molded 25 part at the designated separating line.

Figure 2C:
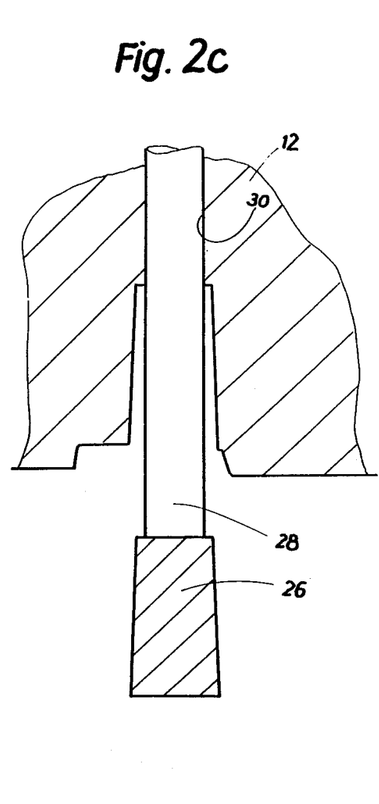
Figure 3:
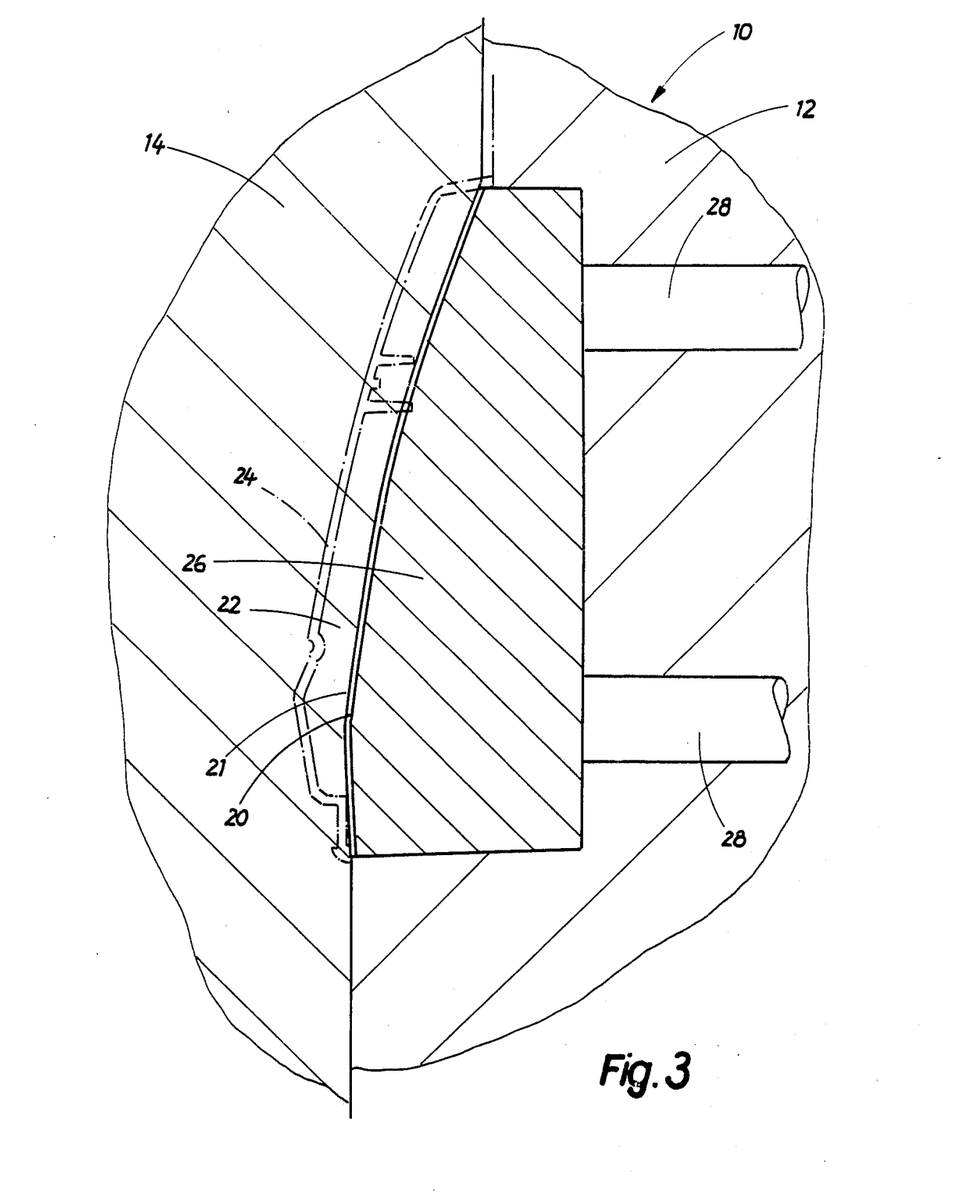
FIG. 3 is a view showing a section taken along the line 3—3 in FIG. 1.
Figure 4:
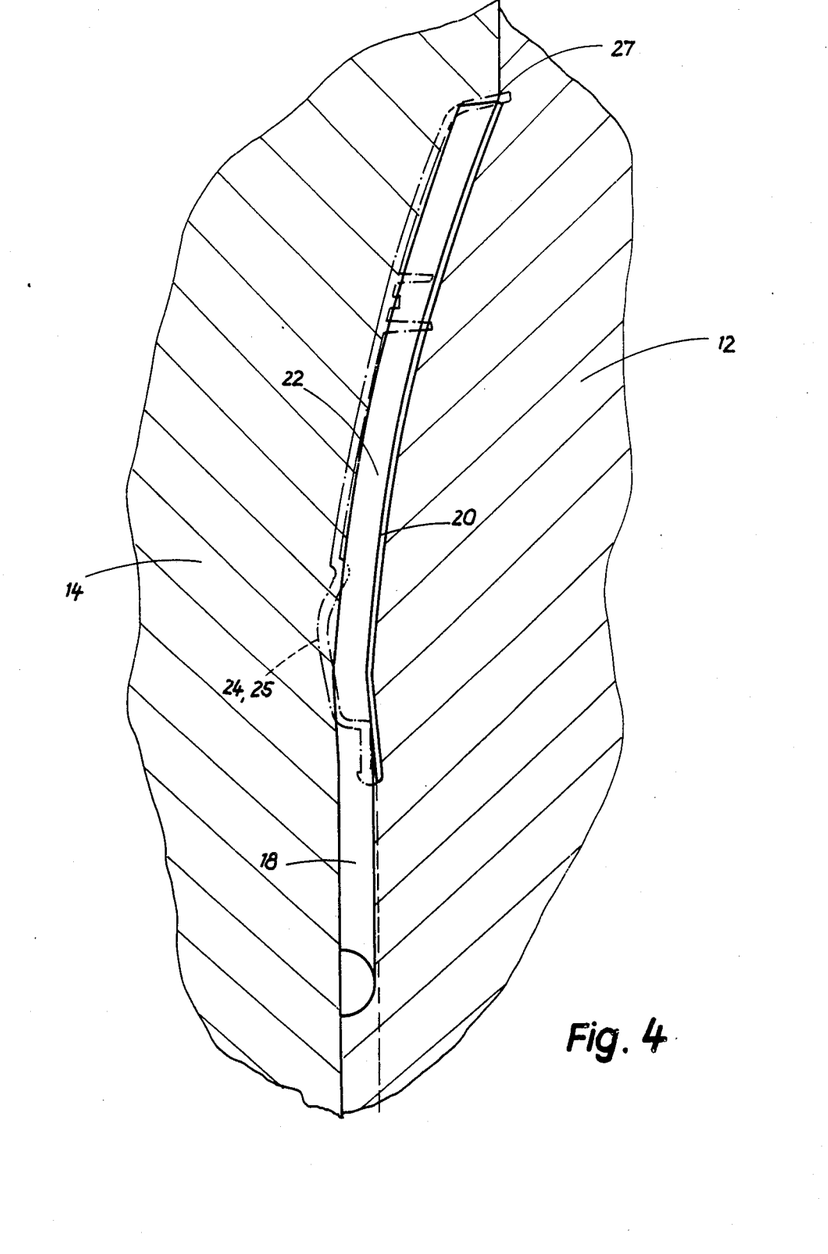
FIG. 4 is a view showing a section taken along the line 4—4 in FIG. 1.

The separation of the sprue and the overflow is performed before the end of the starting time which is needed, from the beginning of the mixing of the reaction components to setting the reaction. The hardening of the molded part 25 is therefore performed already with the separated sprue and overflow, so that after the end of the molding time and opening of the molding tool 10, the molded part 25 and the already separated sprue and overflow parts can be removed. For facilitating the parts removal, the displacing slider 26 can be slidingly displaced to the position shown in FIG. 2c, in which it extends outwardly beyond the upper part 12. In this position a cleaning, if necessary, of the displacing slider is also possible, prior to its retraction to the initial position shown in FIG. 2a. The same is true with respect to the displacing slider 48 and the mold opening slider 52.

Figures 7A, 7B, 8:
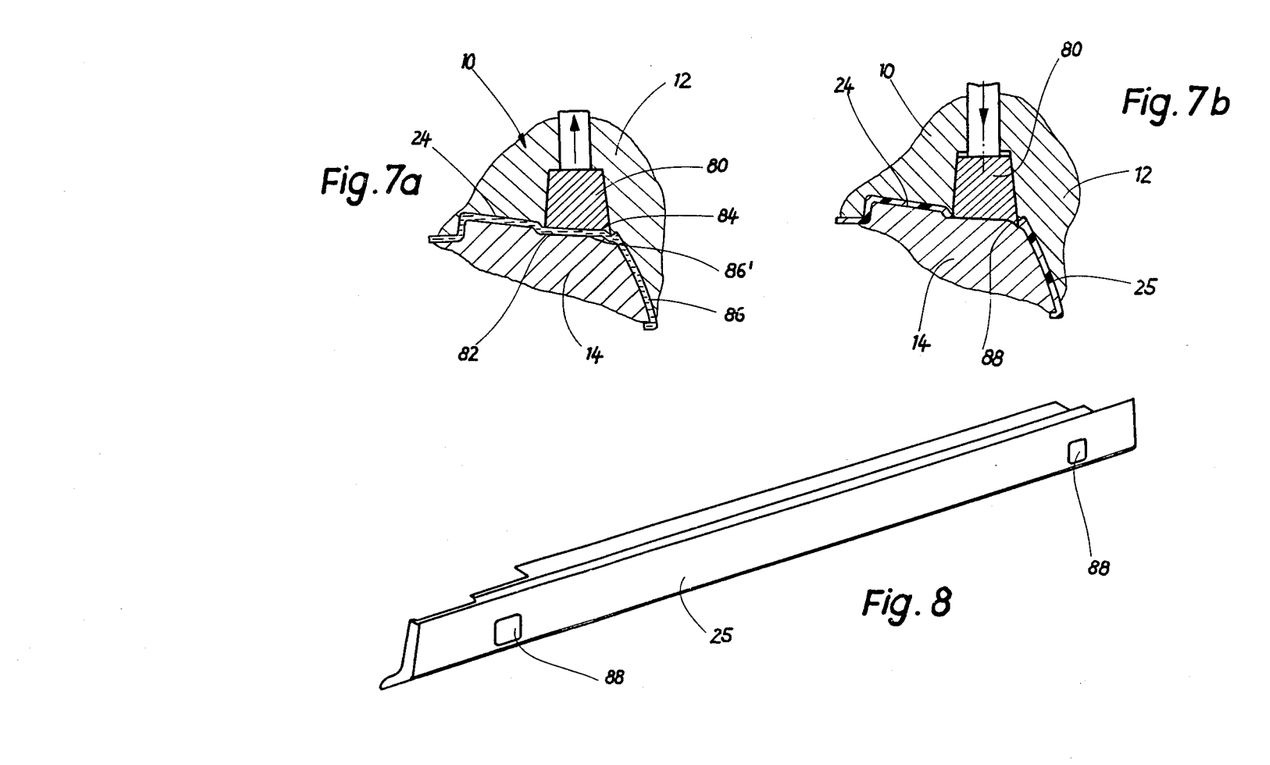
FIGS. 7a–7b are views showing a vertical section of the molding tool in the region of a mold nest with a displacing slider for forming hollows in a molded part, in two different positions.
FIG. 8 is a view showing a molded part with hollows, produced in the tool illustrated in FIGS. 7a–7b.

In the embodiment shown in FIGS. 7a and 7b a further displacing slider 80 is arranged displaceably in the upper part 12 of the molding tool 10. The displacing slider 80 is displaceable with its end surface 82 in the mold nest 24 relative to the upper surface of the lower part 14. In the retracted position shown in FIG. 7a, the end surface 82 of the displacing slider 80, on the one hand, and the opposite upper surface of the lower part 14, on the other hand, limit a throughflow gap 84 for the reaction mixture injected into the molding tool. The throughflow gap 84 is in alignment with the neighboring regions of the mold nest. The reaction mixture can therefore expand in an undisturbed manner through the throughflow gap, without causing swirling. When the displacing slider 80 is displaced toward the upper surface of the lower part 14 after the elapse of the shooting time but before elapse of the starting time as shown in FIG. 7b, a still liquid material 86' is displaced from the throughflow gap 84 into the neighboring region of the mold nest. The displacement volumes can be selected during the initial setting of the weight of the shot, so that a space remains in the mold nest for the material 86' displaced from the throughflow gap. As a result of the material displacement, a hollow 88 is formed in the molded part 25. The contour of this hollow is determined by the crosssection of the displacing slider 80. For ensuring a complete displacement of the material located in the gap 84, the shape of the end surface of the displacing slider 80 is formed in correspondence with the shape of the upper surface of the neighboring lower part 14.

A molded part 25 in the embodiment shown in FIG. 8 is provided with the hollows 88 which are produced in the molding tool 10 in correspondence with FIGS. 7a and 7b.

Figure 9A:
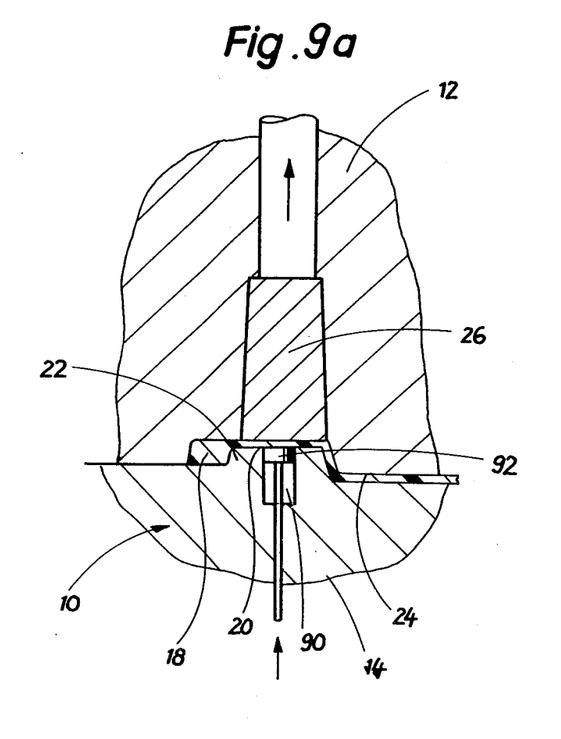
FIGS. 9a–9b are views showing a vertical section through a sprue region of the molding tool with a displacing slider and a displacement chamber, in two different positions.
Figure 9B:
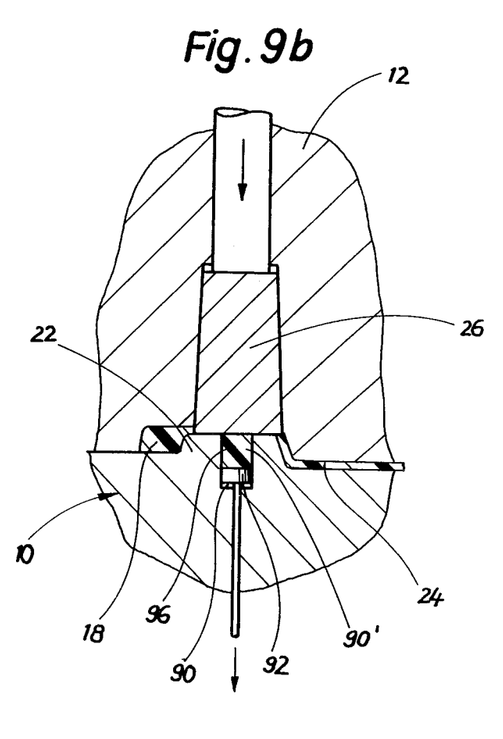

In the embodiment of FIGS. 9a and 9b, the sprue region of a molding tool has a sprue gap 20 which is limited by the displacing slider 26 in the upper part 12 and a displacement chamber 90' in the region of the limiting member 22 of the lower part 14. The displacement chamber 90' is a component of a cylinder 90 which is open to the sprue gap 20. A piston 92 is arranged in the cylinder 90 movably by a non-illustrated hydraulic cylinder-piston unit, in synchronism with the displacing slider 26. In the retracted position of the displacing slider 26 shown in FIG. 9a, the sprue gap 20 is open for passing the injected reaction mixture therethrough. In this case the piston 92 is located in the cylinder 90 in its upwardly displaced position, in which its end surface is in alignment with the remaining wider side surface of the limiting member 22. During the displacement, the displacing slider 26 and the piston 92 are displaced to the position shown in FIG. 9b. A material 96 which is displaced from the sprue gap 20 flows into a displacement chamber 90' formed by the lowered piston 92. In the respective end position the displacement chamber 90' and the sprue passage 18 as well as the mold nest 24 are completely separated. The synthetic plastic material 96 located there is hardened as a separate part, and after the end of the molding time and opening of the molding tool 10 is expelled by the upwardly moving piston 92.

The use of the displacement chambers is advantageous especially for the molding tools for small weights of shot in which the material 96 to be displaced occupies a not insignificant significant part of the whole volume. Basically it is possible to arrange the displacement chambers also in the region of the further displacing sliders 48 and 80.

Figure 6:
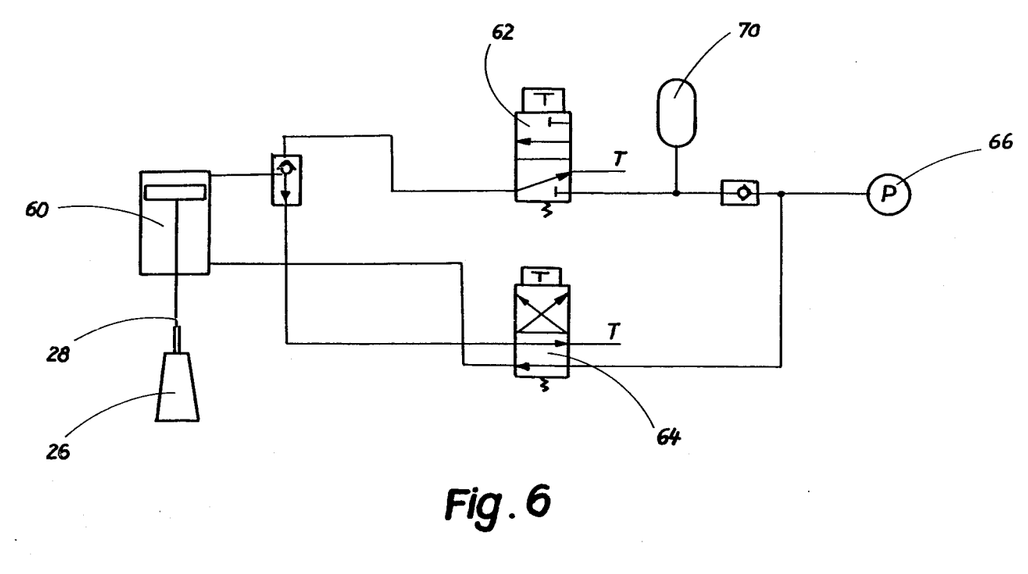
FIG. 6 is as view showing an electrohydraulic control of the displacing sliders.

As shown in FIG. 6, the actuation of the displacing sliders 26, 48, 80 is performed by a double-acting cylinder-piston unit 60. The latter supplies hydraulic fluid through a pump 66 and a pressure accumulator 70 in one or another direction, in accordance with required positions of both electromagnetic valves 62 and 64. The pressure accumulator 70 serves for contributing to a fast movement of the displacing sliders 26, 48, 80 in an advancing direction.

The invention is not limited to the details shown, since various modifications and structural changes are possible without departing in any way from the spirit of the present invention.

What is desired to be protected by Letters Patent is set forth in particular in the appended claims.

I claim:

1. An apparatus for producing synthetic plastic molded parts, comprising
    means for forming a sprue passage through which a reaction mixture formed by mixing of two reaction components passes in a liquid state and in which a sprue part is formed;
    a molding tool having an upper part and a lower part and a mold nest which communicates with said sprue passage so that the reaction mixture is injected via said sprue passage into said mold nest in a flow direction, so as to form a molded part in said molded nest;
    one limiting member located in a region between said sprue passage and said mold nest so as to limit one side of a sprue gap formed between said sprue passage and said mold nest, said one limiting member having a predetermined width and length;
    means for separating the sprue part from the molded part, and including one blocking member which is located in the region between said sprue passage and said mold nest and formed as one displacing slider,
    said one displacing slider having an end surface which limits another side of said sprue gap, and has a width and length corresponding to the width and length of said one limiting member, said one displacing slider being movable relative to said one limiting member so as to close said sprue gap,
    said one displacing slider being formed simultaneously as a mold opening member which is displaceable beyond a respective one of said parts of said molding tool.

2. An apparatus as defined in claim 1, wherein said one limiting member is a part of a separating wall provided between said sprue passage and said mold nest.

3. An apparatus as defined in claim 1, wherein said mold nest has a separating plane, said sprue passage and said one limiting member being located below said separating plane, said sprue gap extending in a plane corresponding to said separating plane.

4. An apparatus as defined in claim 1; and further comprising a mold opening member connected with said upper part, said other limiting member being arranged on said mold opening member.

5. An apparatus as defined in claim 1; and further comprising an additional slider which is formed as a mold opening member.

6. An arrangement as defined in claim 5, wherein said molding tool has an undercut, said mold opening member being arranged in the region of said undercut; and further comprising a sliding member against which said mold opening member slidingly abuts.

7. An apparatus as defined in claim 1, further comprising another limiting member located downstream of said one limiting member as considered in the flow direction so as to limit one side of a throughflow gap for a further material of the reaction mixture; and
    means for separating the further material and including at least another blocking member located downstream of said one blocking member as considered in the flow direction, the other blocking member being formed as another displacing slider which is movable relative to the other limiting member transversely to said throughflow gap so as to close said throughflow gap and to displace the further material from said throughflow gap.

8. An apparatus as defined in claim 7; and further comprising a cylinder-piston unit arranged to move a respective one of said displacing sliders; and a pretensioned pressure accumulator supplying said cylinder-piston unit for increasing a speed of the movement of the respective displacing piston in an advancing direction.

9. An apparatus for producing synthetic plastic molded parts, comprising
    means for forming a sprue passage through which a reaction mixture formed by mixing of two reaction components passes in a liquid state and in which a sprue part is formed;

a molding tool having an upper part and a lower part and a mold nest which communicates with said sprue passage so that the rection mixture is injected via said sprue passage into said mold nest in a flow direction, so as to form a molded part in said mold nest;

one limiting member located in a region between said spr passage and said mold nest so as to limit one side of a sprue formed between said sprue passage and said mold nest, said one limiting member having a predetermined width and length;

means for separating the sprue part from the molded part, and including one blocking member which is located in the region between said sprue passage and said mold nest and formed as one displacing slider, said one displacing slider having an end surface which limits another side of said sprue gap, and has a width and length corresponding to the width and length of said one limiting member, said one displacing slider being movable relative to said one limiting member so as to close said sprue gap and displace a sprue film formed in said sprue gap, said one limiting member having an edge and a limiting surface, said mold nest being formed so that the molded part formed therein is a thin-walled and box-shaped molded part, said mold nest having a separating plane which coincides with said limiting surface of said one limiting member, said one displacing slider having a side which faces toward said mold nest, and has a contour corresponding to said edge of said limiting member, said one displacing slider having an end surface which extends outwardly beyond said edge of said limiting surface at most by a wall thickness of the molded part, so as to at least partially engage said edge of said limiting surface of said one limiting member.

10. An apparatus as defined in claim 9, further comprising another limiting member located downstream of said one limiting member as considered in the flow direction so as to limit one side of a throughflow gap for a further material of the reaction mixture; and means for separating the further material and including at least another blocking member located downstream of said one blocking member as considered in the flow direction, the other blocking member being formed as another displacing slider which is movable relative to the other limiting member transversely to said throughflow gap so as to close said throughflow gap;

said other limiting member having an edge and a limiting surface with a predetermined width and length, said other displacing slider having an end surface with a width and length corresponding to the width and length of said limiting surface of said other limiting member, said other displacing slider having a side which faces toward said mold nest and has a contour corresponding to said edge of said other limiting member, said end surface of said other displacing slider extending outwardly beyond said edge of said other limiting member at most by a wall thickness of the molded part so as to at least partially engage said edge of said other limiting member.

11. An apparatus as defined in claim 10; and further comprising means for hydraulically controlling the movement of said other displacing slider synchronously with the movement of said one displacing slider.

12. An apparatus as defined in claim 10; and further comprising means for hydraulically controlling the movement of said other displacing slider with a short delay relative to the movement of said one displacing slider.

13. An apparatus as defined in claim 10, wherein said throughflow gap is an overflow gap formed at a side of said molding tool, which is opposite to said sprue passage, said other displacing slider being movable transversely to said overflow gap so as to displace the further material from said overflow gap.

14. An apparatus as defined in claim 13; and further comprising means shaping an overflow chamber formed so that said overflow gap is open into said overflow chamber.

15. An apparatus as defined in claim 10, wherein said throughflow gap is formed in said mold nest and is closable by said other displacing slider with formation of a material hollow in the molded part, said other displacing slider having a cross-section corresponding to a contour of the material hollow, and an end surface with a shape corresponding to said other limiting member.

16. An arrangement as defined in claim 10; and further comprising means for forming a displacement chamber located in the region of at least one of said sprue gap and said throughflow gap for receiving the sprue film or the further material displaced by a respective one of said displacing sliders.

17. An apparatus as defined in claim 16, wherein said displacement chamber opens into a respective one of said gaps and has a piston which is actuated in synchronism with a respective one of said displacing sliders, so as to change a receiving volume in said displacement chamber.

* * * * *